United States Patent [19]

White

[11] Patent Number: 5,584,536
[45] Date of Patent: Dec. 17, 1996

[54] CUSHIONED SEAT BELT ATTACHMENT

[76] Inventor: Edwin J. White, 6 Skylark Dr., Corbin, Ky. 40701

[21] Appl. No.: 611,237
[22] Filed: Mar. 5, 1996
[51] Int. Cl.⁶ .................................................. B60R 21/00
[52] U.S. Cl. .................................... 297/482; 297/DIG. 3; 297/DIG. 6
[58] Field of Search ............................ 297/DIG. 3, 482, 297/468, 464, 463.2, DIG. 6, 463.1; 280/733

[56] References Cited

U.S. PATENT DOCUMENTS

| D. 302,607 | 8/1989 | Krebs et al. | D29/10 |
|---|---|---|---|
| 3,883,053 | 5/1975 | Pritchard et al. | 280/733 X |
| 3,941,404 | 3/1976 | Otaegui-Ugarte | 280/733 |
| 4,575,874 | 3/1986 | Johnson | 297/482 X |
| 4,741,574 | 5/1988 | Weightman et al. | 280/733 X |
| 5,333,902 | 8/1994 | Hatfield | 280/733 |
| 5,421,614 | 6/1995 | Zheng | 297/482 X |

*Primary Examiner*—Milton Nelson, Jr.

[57] ABSTRACT

The present device relates to a seat belt cushioning device which is adapted to be positioned over the existing seat belt of a vehicle. More specifically, the present device is adapted to be positioned over the shoulder restraint portion of a vehicle seat belt in order to reduce any pressure that is applied to the chest of a wearer. The present device defines particular application with users who have recently undergone heart surgery and need to avoid any excess pressures that may otherwise be applied to the chest. Thus, the device of the present device is adapted to be secured over the shoulder restraint of a vehicle seat belt to reduce any pressures that are applied to the chest of a wearer.

4 Claims, 2 Drawing Sheets

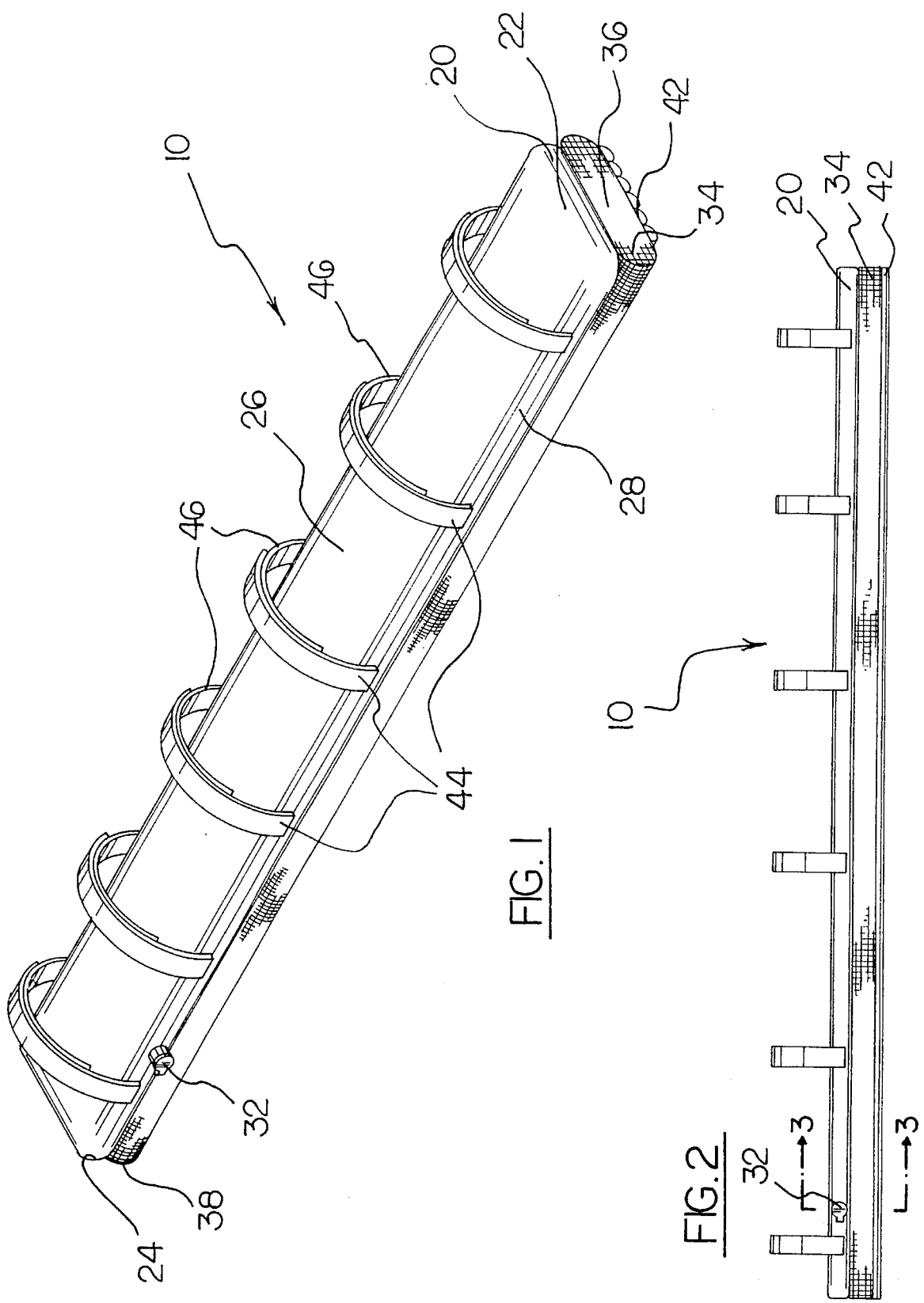

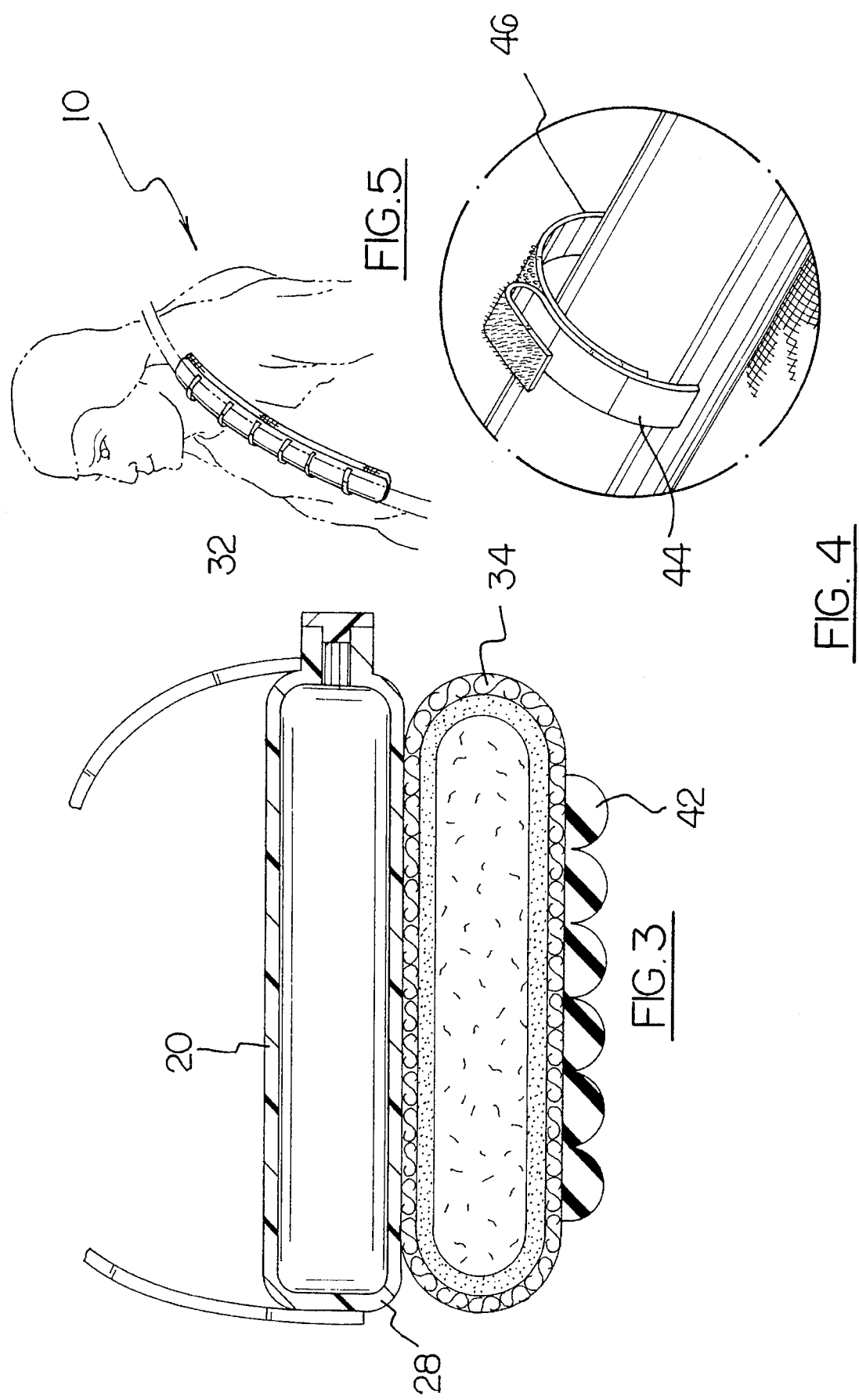

CUSHIONED SEAT BELT ATTACHMENT

BACKGROUND OF THE INVENTION

1. Field of the Invention

The present invention relates to cushioned seat belt attachment and, more particularly, pertains to air cushioned seat belt attachment.

2. Description of the Prior Art

The use of seat belt cushion apparatus is known in the prior art. More specifically, seat belt cushion apparatus heretofore devised and utilized for the purpose of cushioning seat belts are known to consist basically of familiar, expected and obvious structural configurations, notwithstanding the myriad of designs encompassed by the crowded prior art which have been developed for the fulfillment of countless objectives and requirements.

By way of example, U.S. Pat. No. 5,322,349 to Gianino; U.S. Pat. No. 4,741,574 to Weightman et al.; U.S. Pat. No. Des. 338,552 to Carrico et al.; U.S. Pat. No. 5,005,866 to Reedom; U.S. Pat. No. Des. 308,287 to Miller et al.; U.S. Pat. No. Des. 302,607 to Krebs all disclose various seat belt cushioning and/or patting system. Furthermore, U.S. Pat. No. 5,924,183 to Wetter et al. discloses a shock absorber for vehicle seat belts.

in this respect, the cushioned seat belt attachment according to the present invention substantially departs from the conventional concepts and designs of the prior art, and in so doing provides an apparatus primarily developed for the purpose of air cushioned seat belt attachment.

Therefore, it can be appreciated that there exists a continuing need for new and improved cushioned seat belt attachment which can be used for air cushioned seat belt attachment. In this regard, the present invention substantially fulfills this need.

SUMMARY OF THE INVENTION

In view of the foregoing disadvantages inherent in the known types of seat belt cushion apparatus now present in the prior art, the present invention provides an improved cushioned seat belt attachment. As such, the general purpose of the present invention, which will be described subsequently in greater detail, is to provide a new and improved cushioned seat belt attachment apparatus and method which has all the advantages of the prior art and none of the disadvantages.

To attain this, the present invention essentially comprises a new and improved seat belt cushioning device which releases pressure applied to the chest of a user, comprising, in combination, an elongated air bladder having a first end, a second end and an intermediate extent therebetween. The air bladder further includes an upper surface, a lower surface with a peripheral edge therebetween. An air valve is positioned to the peripheral edge of the air bladder. The air valve permits pressurized air to be delivered into the bladder and further permits air of a predetermined pressure to be expelled from the bladder. An elongated cushion is provided and has a first end, a second end and an intermediate end therebetween. The cushion further includes an upper surface, a lower surface with a peripheral edge therebetween. The upper surface of the cushion is secured to the lower surface of the air bladder. A number of elongated ribs are secured to the lower surface of the cushion. The elongated ribs are adapted to be positioned over the chest of a user. A first set of seat belt straps is provided. Each of the straps of the first set have a first end secured to the peripheral edge of the air bladder and a pile-type fastener secured to the opposite end. A second set of seat belt straps is also provided. Each of the straps of the second set have a first end secured to the peripheral edge of the air bladder and a hook-type fastener secured to the opposite end. Each of the straps of the first set are adapted to engage a strap of the second set to form a closed loop. The first and second sets of seat belt straps function to secure the cushion device to a seat belt.

There has thus been outlined, rather broadly, the more important features of the invention in order that the detailed description thereof that follows may be better understood, and in order that the present contribution to the art may be better appreciated. There are, of course, additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

It is therefore an object of the present invention to provide a new and improved cushioned seat belt attachment which has all the advantages of the prior art seat belt cushion apparatus and none of the disadvantages.

It is another object of the present invention to provide a new and improved cushioned seat belt attachment which may be easily and efficiently manufactured and marketed.

It is a further object of the present invention to provide a new and improved cushioned seat belt attachment which is of a durable and reliable construction.

An even further object of the present invention is to provide a new and improved cushioned seat belt attachment which is susceptible of a low cost of manufacture with regard to both materials and labor, and which accordingly is then susceptible of low prices of sale to the consuming public, thereby making such seat belt cushion apparatus economically available to the buying public.

Still yet another object of the present invention is to provide a new and improved cushioned seat belt attachment which provides in the apparatuses and methods of the prior art some of the advantages thereof, while simultaneously overcoming some of the disadvantages normally associated therewith.

Still another object of the present invention is to air cushioned seat belt attachment.

Lastly, it is an object of the present invention to provide a new and improved cushioning device which is adapted to be positioned over the existing seat belt of a vehicle. More specifically, the present invention is adapted to be positioned over the shoulder restraint portion of a vehicle seat belt in order to reduce any pressure that is applied to the chest of a wearer. The present invention defines particular application with users who have recently undergone heart surgery and need to avoid any excess pressures that may otherwise be applied to the chest. Thus, the device of the present invention is adapted to be secured over the shoulder restraint of a vehicle seat belt to reduce any pressures that are applied to the chest of a wearer.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 1 is a perspective illustration of the preferred embodiment of the cushioned seat belt attachment constructed in accordance with the principles of the present invention.

FIG. 2 is a side view of the cushioning device in accordance with the present invention.

FIG. 3 is a view taken along line 3—3 of FIG. 2.

FIG. 4 is a view of one of the securing straps in accordance with the present invention.

FIG. 5 is a view of the device in use.

Similar reference characters refer to similar parts throughout the several views of the drawings.

DESCRIPTION OF THE PREFERRED EMBODIMENT

With reference now to the drawings, and in particular to FIG. 1 thereof, a new and improved cushioned seat belt attachment embodying the principles and concepts of the present invention and generally designated by the reference numeral 10 will be described.

The present invention relates to a seat belt cushioning device which is adapted to be positioned over the existing seat belt of a vehicle. More specifically, the present invention is adapted to be positioned over the shoulder restraint portion of a vehicle seat belt in order to reduce any pressure that is applied to the chest of a wearer. The present invention finds particular application with users who have recently undergone heart surgery and need to avoid any excess pressures that may otherwise be applied to the chest. Thus, the device of the present invention is adapted to be secured over the shoulder restraint of a vehicle seat belt to reduce any pressures that are applied to the chest of a wearer. The various components of the present invention, and the manner in which they interrelate, will be described in greater detail hereinafter.

The device 10 of the present invention includes an elongated air bladder 20 which is defined by a first end 22, a second end 24 and an intermediate extent 26 therebetween. Furthermore, the air bladder 20 is further defined by an upper surface, a lower surface and a peripheral edge 28 extending therebetween. Furthermore, an air valve 32 is positioned through the peripheral edge 28 of the air bladder 20. In the preferred embodiment, this air valve is positioned approximate the lower end of the device. This air valve 32 permits a user to introduce pressurized air into the air bladder to inflate it. The air valve 32 includes a cover which prohibits the egress of air from the internal portion of the air bladder. However, this air valve 32 does permit air of a predetermined pressure to be expelled from the bladder 20. More specifically, when the air bladder is properly inflated and a predetermined amount of force is applied to the device 10, air will be expelled from the air bladder 20 by way of the air valve 32. Thus, in use if the vehicle is brought to a quick stop, or otherwise undergoes deceleration, and a requisite amount of force is applied to the device 10 by way of the user, the air valve 32 will permit air to evacuated from the air bladder 20 and thus give the user a cushioning effect.

A further component of the device 10 is the elongated cushion 34. This cushion is defined by a first end 36, a second end 38 and an intermediate extent therebetween. The cushion is further defined by an upper surface, a lower surface and a peripheral edge which extends therebetween. As is illustrated in FIG. 3, the upper surface of the cushion 34 is secured to the lower surface of the air bladder 20. As is further illustrated in FIG. 3, the cushion 34 can include an interior portion of foam material, an intermediate sleeve of a cloth material and an outer sleeve of a durable cover material.

With further reference to FIG. 3, a number of elongated ribs 42 are secured to the lower surface of the cushion 34. These elongated ribs 42 are adapted to be positioned over the chest of a user. The elongated ribs 42 have a curved cross section and thus facilitate in the distribution of any forces which are delivered to the chest of a user.

The device 10 of the present invention further includes a first set of seat belt straps 44. Each of the straps has a first end which is secured to the peripheral edge 28 of the air bladder 20 and an opposite end to which is secured a pile-type fastener. Likewise, a second set of seat belt straps 46 are included. Each of these straps includes a first end secured to the peripheral edge 28 of the air bladder 20 and an opposite end to which a hook-type fastener is secured. Each of the straps of the first set 44 is adapted to engage one of the straps of the second set 46 to form a closed loop. Thus, the first and second set of seat belt straps 44 and 46 respectively, function to secure the cushion device 10 about the seat belt of a vehicle. This arrangement can most clearly be seen in FIG. 5.

Thus, in operation, a user who has recently undergone any type of chest surgery and who thus wishes to avoid any undue stress applied to the chest, would secure the device of the present invention about the shoulder strap of a vehicle. More specifically, the two sets of seat belt straps would be employed in securing the device to a shoulder harness. The device would be secured such that the elongated ribs would be in contact with the user's chest. The elongated cushion and the elongated air bladder would then give a degree of resiliency and comfort to the chest of a user. In the case of a quick deceleration or stop of a vehicle, the air valve of the bladder would permit the egress of pressurized air from the interior portion of the air bladder and thus function to dampen any pressures which would be otherwise delivered to the chest of a user.

As to the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by Letters Patent of the United States is as follows:

1. A new and improved seat belt cushioning device which releases pressure applied to the chest of a user, comprising, in combination:

an elongated air bladder having a first end, a second end and an intermediate extent therebetween, the air bladder further including an upper surface, a lower surface with a peripheral edge therebetween, an air valve positioned to the peripheral edge of the air bladder, the air valve permitting pressurized air to be delivered into the bladder and further permitting air of a predetermined pressure to be expelled from the bladder;

an elongated cushion having a first end, a second end and an intermediate end therebetween, the cushion further including an upper surface, a lower surface with a peripheral edge therebetween, the upper surface of the cushion being secured to the lower surface of the air bladder;

a number of elongated ribs secured to the lower surface of the cushion, the elongated ribs adapted to be positioned over the chest of a user;

a first set of seat belt straps, each of the straps of the first set having a first end secured to the peripheral edge of the air bladder and a pile-type fastener secured to an opposite end; and a second set of seat belt straps, each of the straps of the second set having a first end secured to the peripheral edge of the air bladder and having a hook-type fastener secured to an opposite end, each of the straps of the first set adapted to engage a strap of the second set to form a closed loop, the first and second sets of seat belt straps functioning to secure the cushioning device to a seat belt.

2. A seat belt cushioning device comprising, in combination:

an elongated air bladder having a first end, a second end and an intermediate extent therebetween, the air bladder further including an upper surface, a lower surface with a peripheral edge therebetween, an air valve positioned to the peripheral edge of the air bladder, the air valve permitting pressurized air to be delivered into the bladder and further permitting air of a predetermined pressure to be expelled from the bladder;

an elongated cushion having a first end, a second end and an intermediate end therebetween, the cushion further including an upper surface, a lower surface with a peripheral edge therebetween, the upper surface of the cushion being secured to the lower surface of the air bladder;

a first set of seat belt straps, each of the straps of the first set having a first end secured to the peripheral edge of the air bladder and a fastener secured to an opposite end; and a second set of seat belt straps, each of the straps of the second set having a first end secured to the peripheral edge of the air bladder and having a fastener secured to an opposite end, each of the straps of the first set adapted to engage a strap of the second set to form a closed loop, the first and second sets of seat belt straps functioning to secure the cushioning device to a seat belt.

3. The device as set forth in claim 2 and further including a number of elongated ribs secured to the lower surface of the cushion, the elongated ribs adapted to be positioned over the chest of a user.

4. The device as set forth in claim 2 wherein the fasteners employed on each of the straps of the first set is a pile-type fastener and the fasteners employed on each of the straps of the second set is a hook-type fastener.

* * * * *